United States Patent [19]

Berg et al.

[11] Patent Number: 5,290,845
[45] Date of Patent: Mar. 1, 1994

[54] AQUEOUS SHEET SILICATE DISPERSIONS, USE OF THESE DISPERSIONS AS COATING ASSISTANTS AND WATER-DILUTABLE COATING COMPOSITIONS CONTAINING SHEET SILICATES

[75] Inventors: Ralf Berg, Munster; Muller Bodo, Wurzburg, both of Fed. Rep. of Germany

[73] Assignee: BASF Lacke & Farben AG, Munster, Fed. Rep. of Germany

[21] Appl. No.: 984,151

[22] Filed: Dec. 1, 1992

Related U.S. Application Data

[63] Continuation of Ser. No. 399,482, Oct. 16, 1989, Pat. No. 5,198,490.

[30] Foreign Application Priority Data

Mar. 7, 1987 [DE] Fed. Rep. of Germany ....... 3707388

[51] Int. Cl.$^5$ .............................. C08J 5/12; C08K 3/34
[52] U.S. Cl. .................................. 524/443; 106/14.44; 106/634; 427/403; 427/404
[58] Field of Search ............... 524/445, 449, 591; 427/403, 404; 106/14.14, 14.17, 14.44, 621, 626, 634, 814

Primary Examiner—Melvyn I. Marquis
Assistant Examiner—D. Aylward
Attorney, Agent, or Firm—Kenyon & Kenyon

[57] ABSTRACT

The invention relates to dispersions which are obtainable from sheet silicates, a protective colloid and an aqueous dispersant and are suitable for the incorporation of sheet silicates into water-dilutable coating compositions. The dispersions according to the invention are obtainable using poly(propylene oxide) as the protective colloid, and the poly(propylene oxide) contains no hydrophobic terminal groups, has on average at least one hydroxyl group per molecule and may optionally contain up to 40% by weight of —$CH_2$—$CH_2$—O— units.

12 Claims, No Drawings

AQUEOUS SHEET SILICATE DISPERSIONS, USE OF THESE DISPERSIONS AS COATING ASSISTANTS AND WATER-DILUTABLE COATING COMPOSITIONS CONTAINING SHEET SILICATES

This application is a continuation of application Ser. No. 07/399,482, filed on Oct. 16, 1989, U.S. Pat. No. 5,198,490.

The invention relates to dispersions which are obtainable from sheet silicates, a protective colloid and an aqueous dispersant and are suitable for incorporation of sheet silicates into water-dilutable coating compositions.

Water-dilutable coating compositions, in particular those which are to be processed by spray application, for example in automotive coating, must have very particular rheological properties. An especially important role is played by the rheological properties in the case of water-dilutable coating compositions which contain metal pigments and are used for the production of the base coat of a two-coat system of the base coat/clear coat type (cf. for example European Patent 38 127).

The rheological properties of water-dilutable coating compositions very decisively influence the application properties of the coating compositions. In the case of water-dilutable coating compositions containing metal pigments, the orientation of the metal pigment particles and hence the achievable metallic effect depend very substantially on the rheological properties of the coating compositions.

To control the rheological properties of aqueous coating compositions, sheet silicates are extensively used. The sheet silicates swell in water and form gels, which have a high flow limit and low plastic viscosity when subjected to shearing.

Incorporation of the sheet silicates into the water-dilutable coating compositions is preferably effected via dispersions which are prepared from a sheet silicate, modified with an anionic protective colloid (for example tetrasodium pyrophosphate), and water. These dispersions have a sol character instead of a gel character and can be incorporated into the water-dilutable coating compositions simply by metering in. On mixing, the effect of the protective colloid is eliminated, and the sheet silicate can display its action as a viscosity assistant.

If the dispersions described above are incorporated into water-dilutable coating compositions, coating compositions are obtained which have poor spray application properties and give moisture-sensitive, poorly adhering coatings. These difficulties occur to a greater extent in the case of water-dilutable coating compositions which contain metal pigments, preferably aluminum pigments in flake form, and are intended to be used for the production of the base coat of a two-coat system of the base coat/clear coat type. In these cases, moisture-sensitive, poorly adhering coatings which have only an inadequate metallic effect are obtained.

It is the object of the invention to provide sheet silicate dispersions which can be readily incorporated into water-dilutable coating compositions and can be used to obtain water-dilutable coating compositions which have optimum rheological properties and good spray application properties and which give moisture-insensitive coatings having good adhesion. It is the particular object of the invention to provide sheet silicate dispersions which can readily be incorporated into water-dilutable coating compositions containing metal pigments suitable for the production of the base coat of a two-coat system of the base coat/clear coat type and which can be used to obtain water-dilutable coating compositions which contain metal pigments and have optimum rheological properties and good spray application properties and can be processed to give moisture-insensitive two-coat metallic effect coatings of the base coat/clear coat type which have a good effect and good adhesion.

This object is achieved, according to the invention, by dispersions of the type stated at the outset, wherein the said dispersions are obtainable using poly(propylene oxide) as a protective colloid, and the poly(propylene oxide) contains no hydrophobic terminal groups, has on average at least one hydroxyl group per molecule and may optionally contain up to 40% by weight of $-CH_2-CH_2-O-$ units.

The invention also relates to water-dilutable coating compositions which contain a sheet silicate, water, binders, if necessary pigments, organic solvents and further conventional additives and which are obtainable by incorporating the sheet silicate into the coating compositions via a dispersion which is obtainable from a sheet silicate, a protective colloid and an aqueous dispersant, wherein the sheet silicate is incorporated into the coating compositions via a dispersion which is obtainable using poly(propylene oxide) as a protective colloid, and the poly(propylene oxide) contains no hydrophobic terminal groups, has an average at least one hydroxyl group per molecule and may optionally contain up to 40% by weight of $-CH_2-CH_2-O-$ units.

The invention also relates to a process for incorporating sheet silicates into water-dilutable coating compositions, in which the sheet silicates are incorporated into the coating compositions by incorporating dispersions which are obtainable from the sheet silicate, a protective colloid and an aqueous dispersant, wherein the sheet silicates are incorporated via dispersions which are obtainable using poly(propylene oxide) as a protective colloid, and the poly(propylene oxide) contains no hydrophobic terminal groups, has on average at least one hydroxyl group per molecule and may optionally contain up to 40% by weight of $-CH_2-CH_2-O-$ units.

The invention also relates to the use of the dispersions described above as coating assistants for incorporating sheet silicates into water-dilutable coating compositions, in particular into water-dilutable coating compositions which contain pigments—preferably metallic pigments—and are suitable for the production of base coats of two-coat systems of the base coat/clear coat type.

U.S. Pat. No. 3,687,885 discloses water-dilutable coating compositions which consist of a dispersion of a polymer prepared from ethylenically unsaturated monomers, of a sheet silicate, of a nonionic surfactant and of a thickener. The nonionic surfactants used are alkoxylated alkylphenols and alkoxylated alcohols which are composed of 8 to 22 carbon atoms. The coating compositions described in U.S. Pat. No. 3,687,885 contain no metallic pigments and are completely unsuitable for the production of the base coat of a metallic effect coating of the base coat/clear coat type. U.S. Pat. No. 3,687,885 does not provide the skilled worker with any information at all for achieving the object of the present invention.

Sheet silicates which are suitable for controlling the rheological properties of aqueous coating compositions are very familiar to the skilled worker (cf. for example H. Kittel, Lehrbuch der Beschichtungen, Vol. II, page 340, and Vol. III, page 272 to page 274; VerLag W. A. Colomb 1974, 1976). These are, in particular, aluminm magnesium silicate compounds of the montmorillonite type, for example attapulgite, bentonite or hectorite. Hectorite is often described by the approximate empirical formula $Na_{0.67}(Mg,Li)_6Si_8O_{20}(OH,F)_4$, where Li and F may also be absent.

According to the invention, both natural and synthetic sheet silicates can be used. Synthetic sodium magnesium and sodium magnesium fluorine lithium sheet silicates of the montmorillonite type are preferably used.

Mixtures of different sheet silicates can of course also be used.

According to the invention, the protective colloid used is poly(propylene oxide) which contains no hydrophobic terminal groups, has on average at least one hydroxyl group per molecule and may optionally contain up to 40% by weight of $-CH_2-CH_2-O-$ units.

The term poly(propylene oxide) is understood as meaning compounds which are composed of at least two structural units of the formula $-CHCH_3-CH_2O-$.

Hydrophobic terminal groups are understood as meaning groups which have an important effect on the surfactant properties of the poly(propylene oxide) and which as a rule are derived from hydrophobic compounds which contain more than 6 carbon atoms. Alkylphenols, long-chain aliphatic alcohols, such as, for example, fatty alcohols, long-chain aliphatic amines, such as, for example, fatty amines, long-chain aliphatic carboxylic acids, such as, for example, fatty acids, and long-chain aliphatic carboxamides, such as, for example, fatty acid amides, may be mentioned as examples of such terminal group formers.

The $-CH_2-CH_2-O-$ units which may be incorporated can be randomly distributed, but block copolymers may also be present, the latter being preferred to the former. Suitable block copolymers are copolymers which have a mean molecular weight of from 500 to 8,000, preferably from 1,000 to 5,000, and which contain up to 40, preferably from 10 to 30, particularly preferably from 10 to 20, % by weight of $-CH_2-CH_2-O-$ units. Among the block copolymers which are solid under normal conditions, only those which are water-soluble are suitable. The block copolymers which are liquids under normal conditions need not necessarily be soluble in water.

Preferably used protective colloids are poly(propylene oxide) homopolymers. Poly(propylene oxide) homopolymers which have a mean molecular weight of from 400 to 1,000, very particularly preferably about 900, are preferably composed of straight-chain molecules and on average preferably contain two hydroxyl groups per molecule are particularly preferably used.

Poly(propylene oxide) homopolymers are understood as meaning compounds which—with the exception of any incorporated terminal groups or initiator compounds—are essentially composed only of $-CHCH_3-CH_2O-$ units. The term "essentially" is intended to express the fact that the use of poly(propylene oxide) homopolymers which contain small amounts of foreign monomers (for example butylene oxide) may also lead to usable sheet silicate dispersions.

The polyl(propylene oxides) to be used according to the invention can be prepared in a known manner by polymerization of propylene oxide or by propoxylation of suitable initiator molecules, such as, for example, glycerol, trimethylolpropane, hexanetriol, pentaerythritol, sorbitol, sucrose, ethylenediamine, carboxylic acids, carboxamides, etc. ($-CH_2-CH_2-O-$ groups are introduced by copolymerization with ethylene oxide) and are available commercially in a wide variety.

The sheet silicates are dispersed in an aqueous dispersant. Preferably, exclusively water, very particularly preferably deionized water, is used as the dispersant. The water can, if necessary, preferably contain water-dilutable organic solvents, such as, for example, butanol, butylglycol, ethylene glycol dimethyl ether, cyclohexanone, acetone, etc.

To prepare the dispersions according to the invention, the sheet silicate is mixed intimately with the poly(propylene oxide) as such or, preferably, in the presence of the aqueous dispersant. This mixing is preferably effected using high shear forces (dissolver).

The dispersions according to the invention consist of from 1 to 10% by weight of sheet silicate, from 0.3 to 15% by weight of poly(propylene oxide) and from 98.7 to 75% by weight of aqueous dispersant. From 0.3 to 2 parts by weight of poly(propylene oxide) are used per 1 part by weight of sheet silicate.

In a preferred method of preparation of the dispersions to be used according to the invention, the sheet silicate to be dispersed is first dispersed in some of the total amount of water to be used, with the aid of a dissolver. The appropriate amount of the poly(propylene oxide) to be used is then added to this dispersion, and dispersing is continued using very high shear forces. Finally, the remaining water is added with very vigorous stirring (dissolver), and a ready-to-use sheet silicate dispersion which can be readily incorporated into water-dilutable coating compositions is obtained straightaway.

Water-dilutable coating compositions contain water, water-dilutable binders, if necessary pigments, organic solvents and further conventional additives. These are preferably baking finishes, i.e. water-dilutable coating compositions which are cured on the substrate under the action of heat.

The water-dilutable coating compositions can in principle contain all binders which are suitable for water-dilutable coating compositions. Water-dilutable polyester, polyacrylate, polyurethane or aminoplast resins may be mentioned as examples.

The sheet silicate dispersions according to the invention are preferably incorporated into water-dilutable coating compositions which contain pigments-preferably metallic pigments, particularly preferably aluminum pigments in flake form—and which are suitable for the production of the base coat of the two-coat system of the base coat/clear coat type. Examples of such coating compositions are to be found in U.S. Pat. No. 4,558,090 and European Patent Application 158,099. Preferred coating compositions of this type contain water-dilutable polyurethane resins, with or without water-dilutable polyester and/or polyacrylate resins, as binders, and suitable crosslinking agents.

The dispersions according to the invention are added to the water-dilutable coating compositions in amounts such that the water-dilutable coating compositions contain from 0.5 to 10% by weight, based on the binder solids, of sheet silicate. In cases in which no metallic pigments are present, from 0.5 to 5% by weight, preferably from 1.4 to 3% by weight, based on the binder solids, of sheet silicate are used. In coating compositions containing metallic pigments, from 2 to 10% by weight, preferably from 4 to 6% by weight, based on the binder solids, of sheet silicate are used.

Incorporation of the dispersions according to the invention into the water-dilutable coating compositions can be effected by generally well known methods, as a rule at any time during the production process for the water-dilutable coating compositions.

If the sheet silicate dispersions according to the invention are incorporated into water-dilutable coating compositions, coating compositions are obtained which have excellent spray application properties and give moisture-insensitive coatings having good adhesion. The sheet silicate dispersions according to the invention have a particularly advantageous action if they are incorporated into water-dilutable coating compositions which contain metallic pigments and are suitable for the production of the base coat of a two-coat system of the base coat/clear coat type. The coating compositions obtained in this manner have optimum rheological properties and good spray application properties and can be processed to give moisture-insensitive two-coat metallic effect systems of the base coat/clear coat type which display a good effect and have good adhesion.

The Examples which follow illustrate the invention in more detail. All parts and percentages stated are by weight unless expressly stated otherwise.

EXAMPLE 1

4 parts by weight of a purified sodium magnesium fluorine lithium sheet silicate of the montmorillonite type are added slowly to 50 parts by weight of deionized water with vigorous stirring (dissolver: 3,000 to 4,000 revolutions per minute). Thereafter, 4 parts by weight of a straight-chain poly(propylene oxide) having a mean molecular weight of 900 and an OH number of 125 are added with vigorous stirring, and stirring is continued for a further 15 minutes. A further 42 parts by weight of deionized water are then added, and stirring is continued for a further 15 minutes.

EXAMPLE 2

4 parts by weight of a purified sodium magnesium fluorine lithium sheet silicate of the montmorillonite type which has been modified with tetrasodium pyrophosphate as a protective colloid are added to 50 parts by weight of deionized water with vigorous stirring (dissolver: 3,000 to 4,000 revolutions per minute). After the addition, stirring is continued for a further 15 minutes. A further 46 parts by weight of deionized water are then added with vigorous stirring, and stirring is continued for a further 15 minutes.

EXAMPLE 3

The sheet silicate dispersions obtained according to Example 1 and 2 are incorporated into the water-dilutable basecoating compositions described in the patent examples of EP-A-89,497 and U.S. Pat. Nos. 4,489,135 and 4,558,090 under equivalent conditions.

The basic coating compositions thus prepared are applied to bondered steel sheets by spray application and, after drying in the air for 15 minutes at room temperature (about 20° C.), are coated with a clear coat and baked, as described in EP-A-89,497 and U.S. Pat. Nos. 4,489,135 and 4,558,090.

The basic coating compositions prepared using the sheet silicate dispersions prepared according to Example 1 are clearly superior to the basic coating compositions which have been prepared using the sheet silicate dispersion prepared in Example 2, in the following respects:
a) tendency of the base coat to run,
b) metallic effect,
c) resistance of the two-coat system to moisture (damp heat constant atmosphere: 10 days, 40° C., 100% relative humidity), and
d) adhesion of the coating after exposure to moisture.

We claim:

1. A method of coating a substrate comprising:
preparing a dispersion of a sheet silicate, an aqueous dispersant and a protective colloid which comprises a poly(propylene oxide) polymer having a mean molecular weight of about 500 to about 8,000 and up to about 40% by weight —$CH_2$—$CH_2$—O units and containing no hydrophobic terminal groups, and on average at least one hydroxyl group per molecule;
incorporating said dispersion into a water-dilutable coating composition; and
applying said water-dilutable composition to a substrate.

2. The method of claim 1 wherein the dispersion of sheet silicate comprises from 1 to 10% by weight of the sheet silicate, 0.3 to 15% by weight poly(propylene oxide) polymer and 98.7 to 75% by weight of aqueous dispersant.

3. A method of coating a substrate comprising:
preparing a dispersion of a sheet silicate, an aqueous dispersant and a protective colloid which comprises a poly(propylene oxide) homopolymer having a mean molecular weight of about 400 to about 1,000 and containing no hydrophobic terminal groups, and further containing on average at least one hydroxyl group per molecule;
incorporating said dispersion into a water-dilutable coating composition; and
applying said water-dilutable composition to a substrate.

4. The method of claim 3 wherein the dispersion comprises from 1 to 10% by weight of the sheet silicate, from 0.3 to 15% by weight of the poly(propylene oxide) homopolymer and from 98.7 to 75% by weight of aqueous dispersant.

5. A method of coating a substrate comprising:
preparing a dispersion of a sheet silicate, an aqueous dispersant and a protective colloid which comprises a poly(propylene oxide) homopolymer having a mean molecular weight of about 400 to about 1,000, composed of straight-chain molecules and containing on average two hydroxyl groups per molecule;
incorporating said dispersion into a water-dilutable coating composition; and
applying said water-dilutable composition to a substrate.

6. The method of claim 5 wherein the dispersion comprises from 1 to 10% by weight of sheet silicate, from 0.3 to 15% by weight of poly(propylene oxide) homopolymer and from 98.7 to 75% by weight of aqueous dispersant.

7. The method according to claim 1 wherein said water-dilutable composition contains a metallic pigment.

8. The method according to claim 3 wherein said water-dilutable composition contains a metallic pigment.

9. The method according to claim 5 wherein said water-dilutable composition contains a metallic pigment.

10. The method according to claim 1 wherein said water-dilutable composition forms a basecoat on said substrate and a clearcoat is applied to said basecoat.

11. The method according to claim 3 wherein said water-dilutable composition forms a basecoat on said substrate and a clearcoat is applied to said basecoat.

12. The method according to claim 5 wherein said water-dilutable composition forms a basecoat on said substrate and a clearcoat is applied to said basecoat.

* * * * *